(12) United States Patent
Bernard et al.

(10) Patent No.: US 7,441,948 B2
(45) Date of Patent: Oct. 28, 2008

(54) DE-ICED TOTAL AIR TEMPERATURE SENSOR

(75) Inventors: Marc Bernard, Bourges (FR); Cyril Barre, Issoudun (FR); David Lapeyronnie, Levet (FR)

(73) Assignee: Auxitrol SA (FR)

( * ) Notice: Subject to any disclaimer, the term of this patent is extended or adjusted under 35 U.S.C. 154(b) by 0 days.

(21) Appl. No.: 10/517,796

(22) PCT Filed: Jun. 13, 2003

(86) PCT No.: PCT/FR03/01808

§ 371 (c)(1), (2), (4) Date: Dec. 13, 2004

(87) PCT Pub. No.: WO03/106949

PCT Pub. Date: Dec. 24, 2003

(65) Prior Publication Data

US 2006/0056489 A1   Mar. 16, 2006

(30) Foreign Application Priority Data

Jun. 14, 2002   (FR) .................................... 02 07362

(51) Int. Cl.
*G01K 13/00* (2006.01)
*G01K 1/00* (2006.01)
(52) U.S. Cl. ................... 374/135; 374/148; 374/208; 374/138
(58) Field of Classification Search .............. 374/135, 374/138, 148
See application file for complete search history.

(56) References Cited

U.S. PATENT DOCUMENTS

| 5,043,558 | A | * | 8/1991 | Byles | ............ 219/201 |
| 5,302,026 | A | * | 4/1994 | Phillips | ............ 374/135 |
| 6,622,556 | B1 | * | 9/2003 | May | ............ 73/202.5 |
| D497,114 | S | * | 10/2004 | Willcox | ............ D10/96 |
| 6,974,250 | B2 | * | 12/2005 | Severson | ............ 374/138 |
| 2003/0005779 | A1 | * | 1/2003 | Bernard | ............ 73/861.65 |
| 2003/0051546 | A1 | * | 3/2003 | Collot et al. | ............ 73/170.02 |
| 2003/0058919 | A1 | * | 3/2003 | Ice et al. | ............ 374/138 |

FOREIGN PATENT DOCUMENTS

| EP | 1764593 A2 | * | 3/2007 |
| WO | WO-95/08101 A1 | | 3/1995 |
| WO | WO-01/44821 A1 | | 6/2001 |
| WO | WO-01/88496 A1 | | 11/2001 |

\* cited by examiner

*Primary Examiner*—Gail Verbitsky
*Assistant Examiner*—Mirellys Jagan
(74) *Attorney, Agent, or Firm*—Lerner, David, Littenberg, Krumholz & Mentlik, LLP (57) ABSTRACT

A sensor for measuring a physical parameter of a fluid, in particular for measuring total air temperature, the sensor comprising: a fluid intake (1) fitted to a streamlined body (2); a duct provided in said streamlined body (2) to enable fluid flow, said duct communicating with said fluid intake; and a sensing element disposed inside said duct. The sensor is characterized in that it includes elements that give it improved measurement performance. In particular, the proposed air intake presents an inlet section which extends so as to define a sliding surface suitable for eliminating ice. The invention also provides an improved system for sucking in the boundary layer by using slots, and it also provides a ceramic sensing element that provides better thermal decoupling relative to the de-iced body.

21 Claims, 7 Drawing Sheets

FIG_3

FIG_13a

FIG.16

DE-ICED TOTAL AIR TEMPERATURE SENSOR

CROSS REFERENCE TO RELATED APPLICATIONS

The present application is a 35 U.S.C. § 371 national phase entry of International Application No. PCT/FR03/01808 filed Jun. 13, 2003, published as WO 03/106949 on Dec. 24, 2003, which claims priority from French Application No. 02/07362 filed Jun. 14, 2002, all of which are incorporated herein by reference.

GENERAL FIELD

The present invention relates to a sensor for measuring at least physical parameter of a fluid flow, and in particular it relates to a de-iced sensor of total air temperature.

A particularly advantageous application of the invention lies in the field of aviation for measuring total air temperature admitted to aircraft engines, and/or outside aircraft.

STATE OF THE ART

Numerous de-iced sensors of total air temperature are already known.

Figure 1:
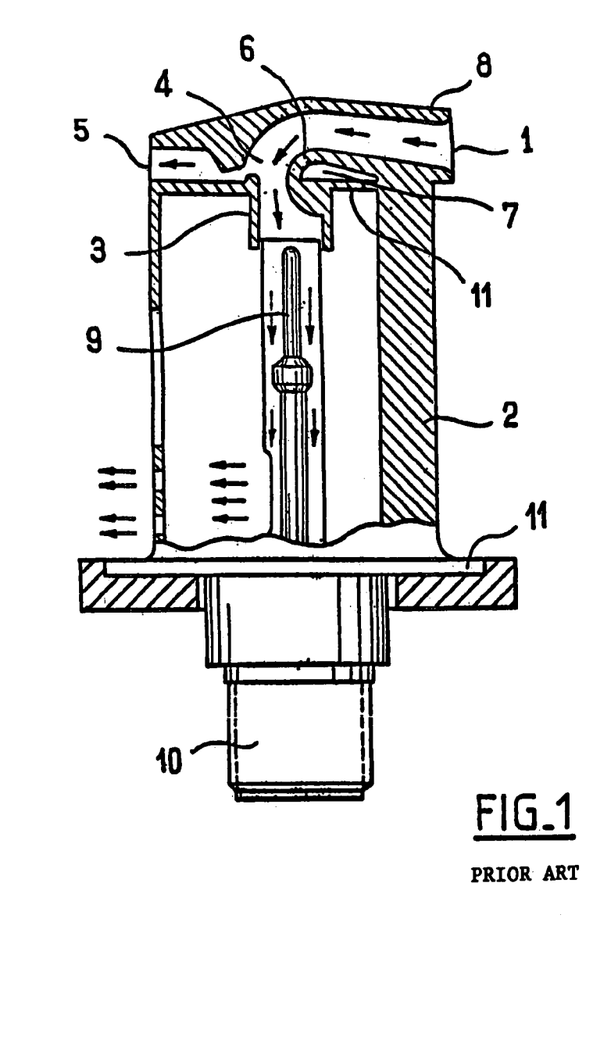
FIGS. 1 and 2, described above, are diagrammatic section and perspective views of a prior art de-iced sensor for measuring total air temperature.
Figure 2:
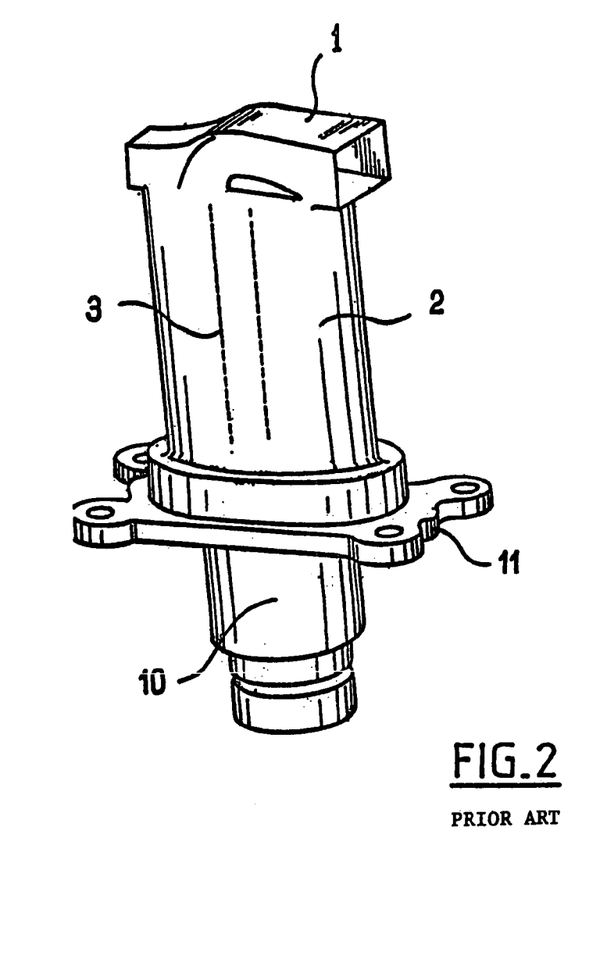

Conventionally, as shown in FIGS. 1 and 2, they comprise an air intake 1 fitted on a streamlined body 2 having a profile of the aircraft wing type.

A duct 3 is provided in the streamlined body 2 and allows the flow of fluid having a physical parameter that is to be measured to be put into communication with the air intake 1 via an inertial separation zone 4.

This zone 4 serves to separate elements of large mass (liquid, frost, sand, . . . ) from the remainder of the gas by centrifuging, said elements being evacuated from the sensor via an ejection zone 5 opposite from the air intake 1.

In order to avoid phenomena of fluid separating in the inertial separation zone, holes 6 are made through the wall thereof on its side opposite from the ejection zone 5, and in communication with the outside via a chamber 7 which extends transversely relative to the streamlined body 2.

The pressure difference that exists between the inside and the outside of the sensor enables the boundary layer to be sucked in through the holes 6.

The assembly comprising the air intake 1, the streamlined body 2, the duct 3, the inertial separation zone 4, and the ejection zone 5 is electrically de-iced by heater resistor elements positioned in grooves 8 formed in the walls of the sensor.

An element 9 forming a sensing element extends inside the duct 3.

By way of example, the element 9 is a resistance thermometer that is thermally insulated from the streamlined body 2.

The streamlined body 2 also referred to as a "mast" is fitted to a fixing flange 11 which is of generally plane shape (for example a disk), extending perpendicularly to the axis of the body 2 and of the duct 3.

A connection socket 10 is fitted to the fixing flange 11 on its side opposite from the streamlined body 2.

Provision can also be made for the streamlined body to be mounted on a moving flap to steer it onto the axis of the air flow.

A structure of this kind is described in particular in patent application WO 01/44821 which describes a multifunction sensor including means for measuring total air temperature mounted on a moving flap and extending therewith along a longitudinal axis that is inclined in the fluid flow.

Generally, as shown in FIG. 2, the air intake 1 is of rectangular inside section and the same applies, at least over a certain fraction, to the duct 3 which is connected to the air intake 1.

The Applicant has recently proposed, in particular in its application WO 01/88496, a sensor structure in which the air intake is of section that is circular or elliptical, at least in part.

It has been shown that such a shape makes it possible to withstand icing conditions that are more severe than is possible with sensors having air intake sections that are rectangular.

SUMMARY OF THE INVENTION

A general object of the invention is to propose a sensor presenting behavior that is further improved under icing conditions, but without degrading measurement performance under dry conditions.

In particular, the invention relates to a sensor comprising a fluid intake fitted to a streamlined body; a duct provided in said streamlined body to enable fluid flow, said duct communicating with said fluid intake; and a sensing element disposed inside said duct.

The invention proposes in particular an air intake structure which enables de-icing speed to be further improved and which enables the drawbacks of air intakes that are conventionally known for this type of sensor to be mitigated.

With prior art sensors, difficulties are encountered in eliminating certain pieces of ice that become blocked against the inlet section of the air intake. In some cases, it can happen that the heating system on its own is not sufficient for disengaging the air intake quickly.

The invention provides a sensor for measuring a physical parameter of a fluid, in particular for measuring total air temperature, the sensor comprising:

a fluid intake fitted to a streamlined body;
a duct provided in said streamlined body to enable fluid flow, said duct communicating with said fluid intake; and
a sensing element disposed inside said duct;
the sensor being characterized in that said fluid intake presents an inlet section which extends in such a manner as to define a surface that slopes relative to the perpendicular to the main flow direction of the fluid at said intake, said surface defining a sliding surface for any pieces of ice that may come to bear thereagainst.

The invention also provides a solution for mitigating the drawbacks that can arise with the boundary layer suction means constituted by the holes 6 in structure of the type shown in FIGS. 1 and 2.

Such suction means present low efficiency, which implies a large number of holes; this implies tight manufacturing tolerances in order to ensure that performance is repeatable; such means are also at the origin of the sensor having significant sensitivity to angle, which degrades measurement performance when the sensor is at an angle of incidence.

The invention proposes a sensor in which the suction means do not present those drawbacks.

In particular, the invention provides a sensor for measuring physical parameter(s) of a fluid, in particular total air temperature, the sensor comprising:

a fluid intake fitted to a streamlined body;
a duct provided in said streamlined body to enable fluid flow, said duct communicating with said fluid intake; and a sensing element disposed inside said duct, the fluid intake presenting an inside section defined by at least one plane surface which communicates with a chamber that opens to the outside and that constitutes a boundary layer suction chamber;

the sensor being characterized in that said plane surface presents for this purpose a plurality of suction slots extending transversely relative to the general flow direction of the stream in the fluid intake.

The invention also proposes improvements relating to the sensing element. Conventionally, the sensing element constituted by a resistive wire wound between two metal tubes from which it is insulated electrically is positioned inside the sensor by means of a hollow metal support. The metal support is assembled with the metal body of the sensor by soldering. As a result, heat dissipated in the sensor body is transmitted to the sensing element by conduction.

In order to limit the effects, it is common practice to use support studs between the metal support and the sensing element.

Nevertheless, support stud structures present numerous drawbacks:

assembly is complex;

the support studs have poor fatigue behavior, leading to the measuring element rupturing; and electrical insulation is limited because metal materials are used.

The invention proposes a structure which enables those drawbacks to be mitigated by using a thermally insulating ceramic as a support mandrel providing improved mechanical strength and thermal decoupling.

Thus, the invention provides a sensor for measuring physical parameter(s) of a fluid, in particular total air temperature, the sensor comprising:

a fluid intake fitted to a streamlined body;

a duct provided in said streamlined body to enable fluid flow, said duct communicating with said fluid intake; and a sensing element disposed inside said duct;

the sensor being characterized in that the sensing element comprises a ceramic tube having a measurement resistive wire wound thereon.

BRIEF DESCRIPTION OF THE FIGURES

Other characteristics and advantages of the invention appear further from the following description which is illustrative and non-limiting and which should be read with reference to the accompanying drawings, in which.

DESCRIPTION OF EMBODIMENTS OF THE INVENTION

General Structure

Figure 3:
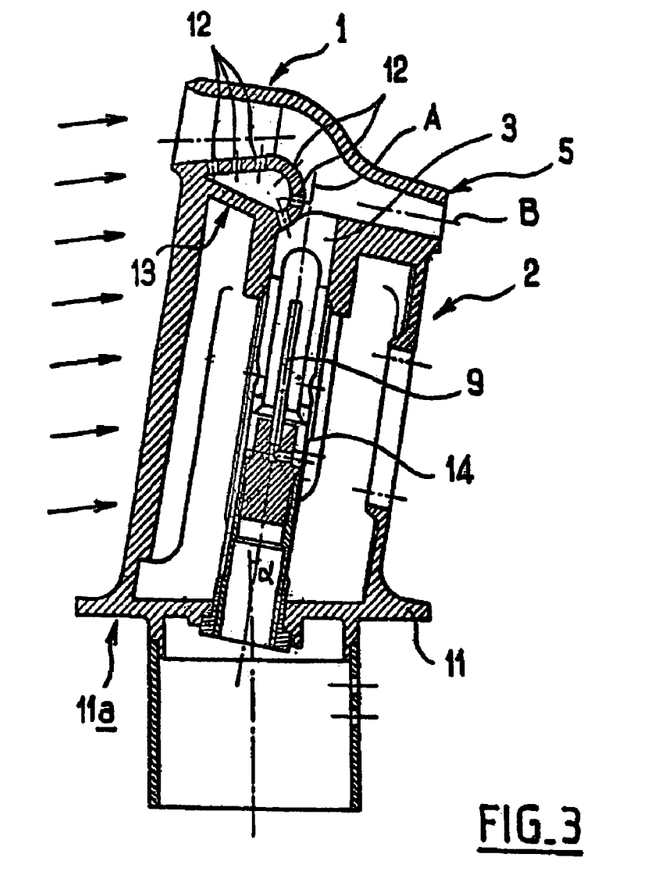
FIG. 3 is a section view showing one possible embodiment of the invention.
Figure 4:
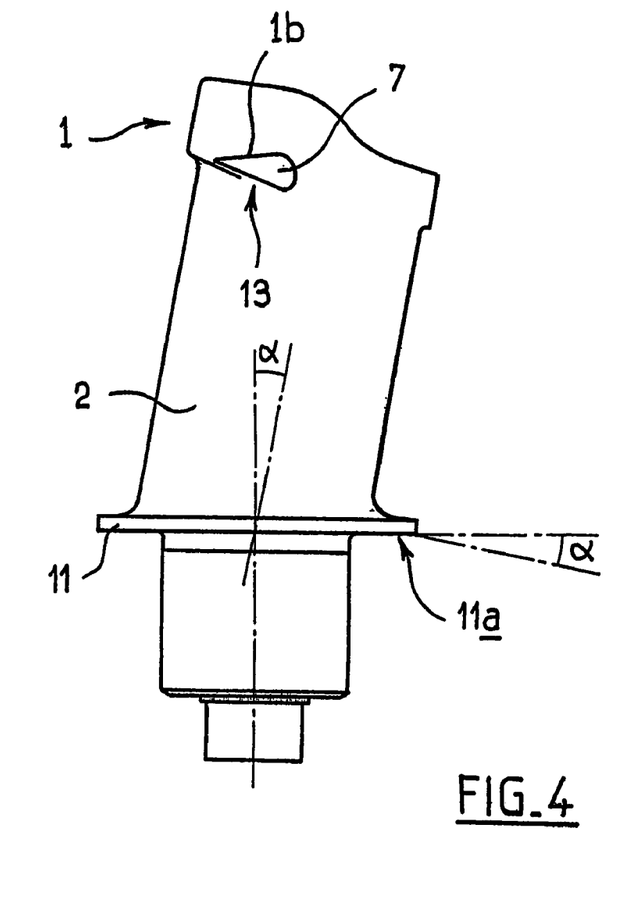
FIG. 4 is a side view of the embodiment shown in FIG. 3.

The sensors shown in FIG. 3 et seq. have an air intake 1 supported by a streamlined body or "mast" 2 and opening out into a duct 3 which extends inside said mast 2, the duct 3 receiving a sensing element 9.

The streamlined body or "mast" 2 extends from a fixing flange 11.

The fixing flange presents, in particular, a bearing surface 11a for bearing against the part on which the sensor is to be fixed (e.g. a portion of fuselage), this bearing surface defining a fixing plane for the sensor.

Inclination and Shape of the Inlet Section

Conventionally, the section supporting the air intake of the sensor is perpendicular to the flow.

Figure 13A:
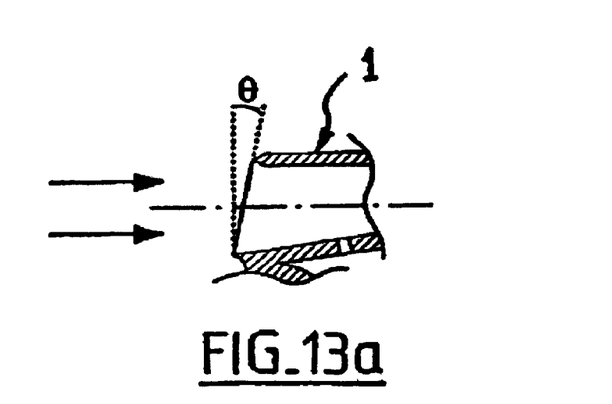
FIGS. 13a and 13b show two possible embodiments for the sliding surface defined by the inlet section of the air intake.

As shown in FIG. 13a, it is proposed that the inlet section of the air intake should be inclined relative to the section orthogonal to the flow by an angle θ.

The inclination is from the bottom edge of the intake going downstream (backwards) so that the inlet section of the air intake constitutes a sliding surface for pieces of ice that become blocked against said air intake.

Such pieces of ice are caused to slide along said surface and to disengage it, said surface being heated by the de-icing system.

With such a structure having an inclined entry section the speed of de-icing is improved by up to 50% (when the angle θ lies in the range 5° to 45°). The angle θ is preferably equal to 10°, in particular.

Figure 13B:
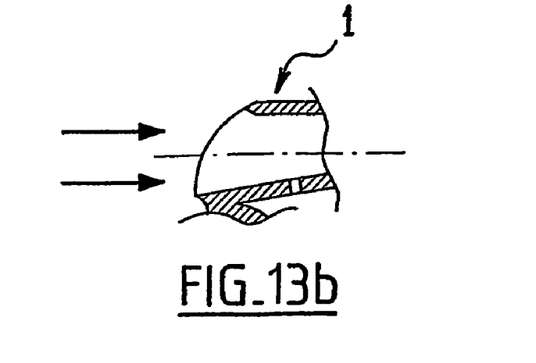

In another variant, and as shown in FIG. 13b, the entry section which forms a sliding surface for ice can be rounded (concave or convex).

Figure 6:
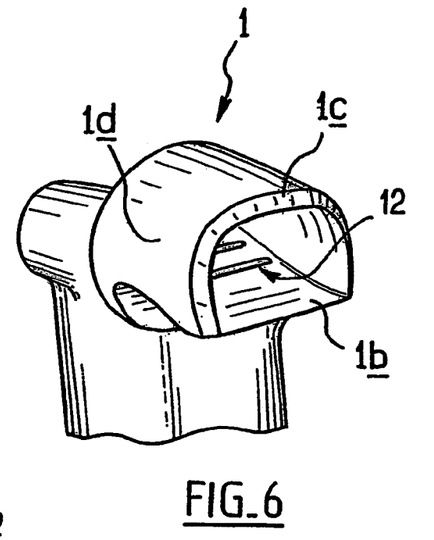
Figure 14:
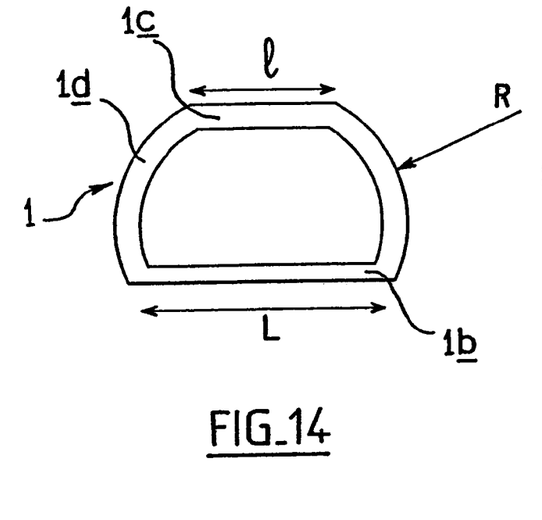
FIG. 14 is a diagrammatic cross-section view of the air intake.

In order to optimize both the speed of de-icing and the efficiency of the suction slots, the shape of the air intake is preferably of the type shown in FIG. 6, and also as shown in FIG. 14.

As can be seen in these figures, this shape comprises two plane sides that are mutually parallel and of different lengths in right section of the air intake. These sides are connected together by two sides of rounded shape.

The side which defines the bottom plane 1b and which carries the suction slots 12 is, for example, of a length lying in the range 15 millimeters (mm) to 25 mm (double-headed arrow referenced L in FIG. 14), while the second side is of a length lying in the range 5 mm to 15 mm (double-headed arrow referenced l in FIG. 14).

The other two sides which are rounded serve to reduce the inside surface area that is exposed to icing. They have a radius of curvature (R) lying in the range 5 mm to 15 mm.

It can also be observed that all of the angles between the various sides of the right section of the air intake are greater than 90°, thus making it possible to limit dead zones and to have a uniform distribution of fluids.

Figure 5:
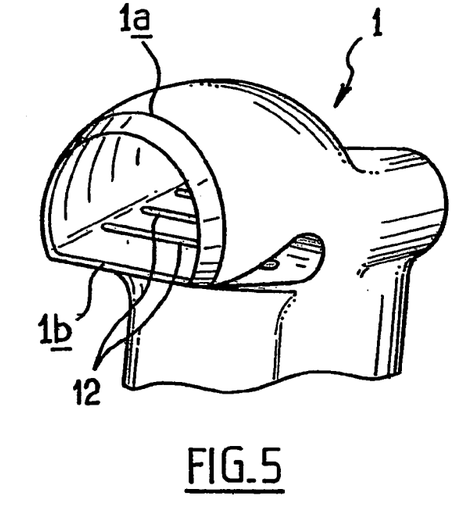
FIGS. 5 and 6 are perspective views showing two examples of air intake shapes.

As shown more particularly in FIGS. 5 and 6, the air intake 1 is of a shape that is rounded, at least in part.

In the example shown in FIG. 5, the air intake 1 is defined by a top portion 1a of inside shape that is substantially cylindrical, and by a bottom wall 1b that is plane in shape, extending between the edge of the opening to the air intake 1 and the inertial zone 4, where the terms "top" and "bottom" should be understood herein as being relative to the main axis of the body 2 with the fixing flange 11 being taken as being at the bottom end and the air intake at the top end. The duct 3 also presents a rounded shape, at least in part.

The use of rounded shapes for the air intake 1 and/or for the duct 3 has the advantage of enabling the inside surface area of the sensor on which ice might be deposited to be reduced, and of eliminating zones in which the flow section of the air or fluid to be measured changes, thereby eliminating the dead zones that are generated in corners.

For given de-icing power, these shapes enable icing conditions to be withstood that are more severe than is possible with conventional sensors having an air intake of rectangular-shaped section; they also make it possible to comply with the latest developments in aviation standards. In particular, for identical icing conditions, the de-icing power required is reduced by 10% to 20% compared with prior art sensors.

Nevertheless, it should be observed that air intakes of the type shown in FIG. 6 are more particularly preferred: in particular the plane top surface 1c makes it possible to ensure an internal compression ratio that is sufficient to ensure good efficiency for the suction system, regardless of the external flow rate.

Suction of the Boundary Layer

Figure 7:
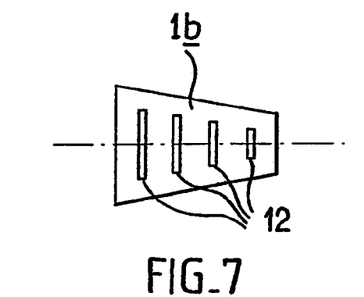
FIG. 7 is a diagrammatic plan view of the bottom wall of the air intake together with means for sucking in the boundary layer included therein.

In the example shown in FIG. 5, as in FIGS. 6 and 7, the plane bottom surface 1b of the air intake 1 does not have the suction holes that are usually provided for systems for sucking in boundary layers, but instead has slots 12 which extend perpendicularly to the flow direction of the stream through the air intake.

Figure 8A:
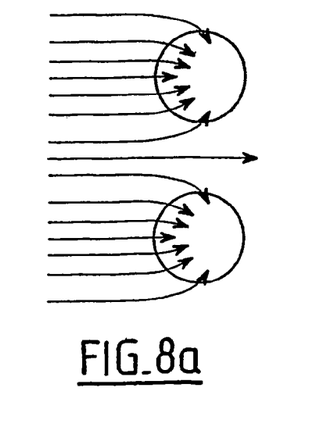
FIGS. 8a and 8b show the flow of the fluid firstly in suction means of the type known in the prior art, and secondly in suction means of the type shown in FIG. 7.
Figure 8B:
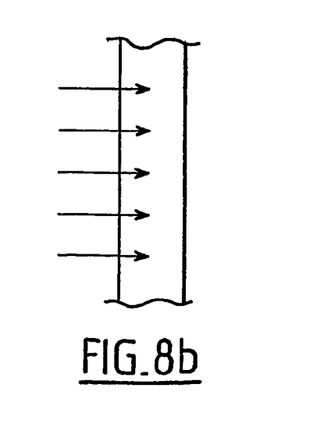

These slots 12 serve to limit development of a thermal boundary layer inside the sensor and also inside the duct 3 which contains the sensing element, because:
- of an increase in suction efficiency due to a larger effective section area; and
- of an absence of flow lines being deflected, said slots making it possible for the flow to present a certain amount of width (flow 2D in FIG. 8b) unlike the suction system based on holes (FIG. 8a).

A particularly advantageous application of this improvement lies with a sensor presenting an angle of incidence relative to the flow direction of the stream that is large (angle of incidence greater than 5°). The angular sensitivity when the heating system is active is then reduced by an amount lying in the range 20% to 50%.

Figure 9A:
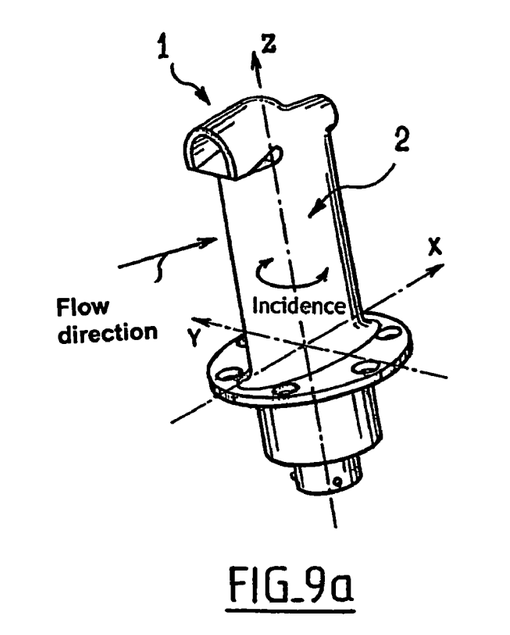
FIGS. 9a and 9b are firstly a diagram showing the angle of incidence taken by the sensor relative to the flow direction, and secondly how measurement error varies as a function of angle of incidence, firstly for a prior art sensor and secondly for a sensor of the type shown in FIGS. 5 to 7.
Figure 9B:
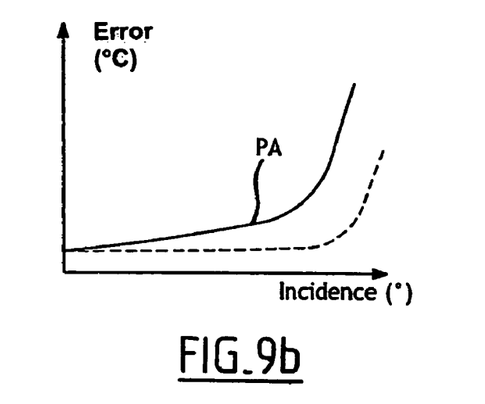

This is shown in FIGS. 9a and 9b, where FIG. 9a defines the angle of incidence taken by the sensor relative to the flow direction (cf. double-headed arrow which represents pivoting about the axis of the sensor), while FIG. 9b is a graph having curves plotted thereon to show how error in measuring total air temperature varies as a function of angle of the incidence between the flow direction and the axis of the sensor, firstly for a prior art sensor having suction holes (continuous line curves), and secondly for a sensor provided with suction slots (dashed line curves).

It can be seen that with suction slots, angular behavior is greatly improved, the sensor being particularly insensitive to the effects of angle, the separation angle of the sensor being in any event pushed back a large amount.

It should also be observed that the use of slots makes it possible to eliminate the cold points that are present between the suction holes used in the prior art and that are liable to encourage retention of ice.

In addition, they are less likely to become obstructed in the event of a foreign body penetrating into the sensor (sand, volcanic dust, . . . ).

Figure 10A:
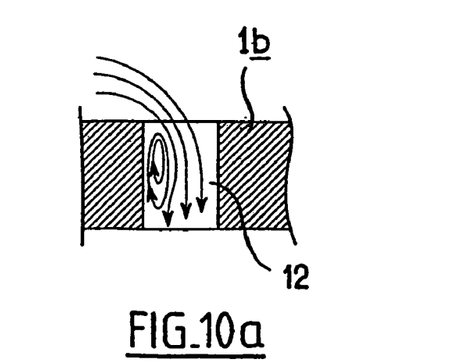
FIGS. 10a and 10b are diagrammatic section views showing the flow of fluid in the thickness of the bottom wall, firstly in suction means having holes (FIG. 10a), and secondly in an advantageous embodiment of the invention (FIG. 10b)
Figure 10B:
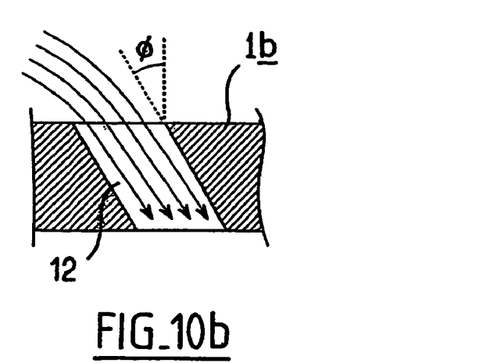

It should also be observed that the slots may advantageously be inclined through the thickness of the bottom wall 1b. This is shown in FIGS. 10a and 10b, which show respectively the flow of a fluid in a slot that is not inclined (FIG. 10a) and in a slot that is inclined (FIG. 10b).

It will be understood from these diagrams that an angle of inclination $\phi$ relative to the perpendicular to the wall 1b enables optimized flow efficiency to be achieved in particular by reducing zones of reverse flow inside the slots and increasing the value of the feed pressure.

By way of example, the angle $\phi$ may lie in the range 10° to 60°. For example it is about 45°.

Figure 11A:
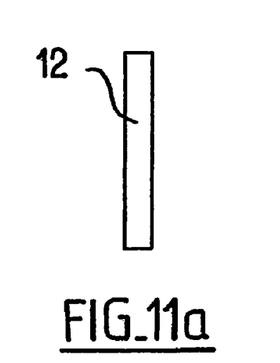
FIGS. 11a, 11b, and 11c show various possible shapes for the slots in a sensor of the invention.
Figure 11B:
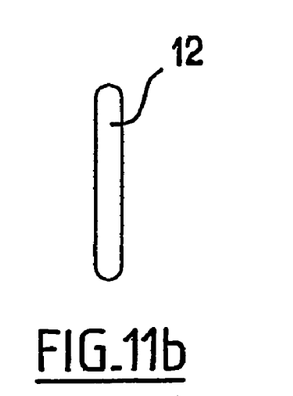
Figure 11C:
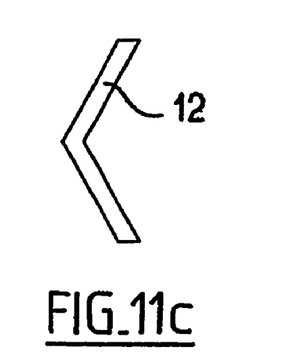

Furthermore, as shown in FIGS. 11a, 11b, and 11c, various different shapes can be envisaged for these slots. In particular, the slots may be of rectangular section (FIG. 11a); they may be of a section having rounded ends (FIG. 11b); they may be in the form of chevrons (FIG. 11c); etc. . . . .

Figure 12:
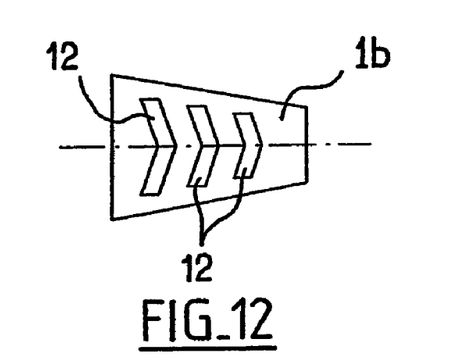
FIG. 12 is a diagrammatic plan view similar to that of FIG. 7, showing another possible embodiment.

FIG. 12 shows a wall having three chevron-shaped slots 12. The tips of the chevrons 12 point towards the ejection zone 5 of the sensor.

Furthermore, these suction slots 12 open out into a chamber 7 which is defined firstly by the wall 1b and secondly by the wall 13. This inclined wall 13 enables the suction capacity of the slots 12 to be increased by optimizing the pressure difference between the inside of the sensor and the openings defined by the shape of the chamber 7, with this being achieved by generating a marginal vortex on the edges of the wall 13. This reduces the error associated with the heating system at low flow rate.

Furthermore, the ejection section of the zone 5 (FIG. 15) is defined so as to allow inertial separation of particles that penetrate into the sensor and to give the sensor good ability to ingest ice crystals and frost.

Sensing Element

Figure 15:
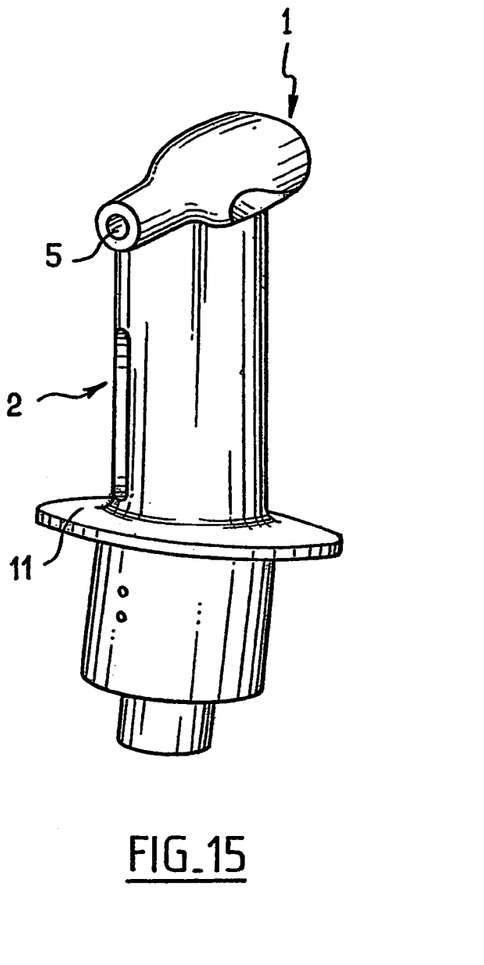
FIG. 15 is a diagrammatic perspective view of a sensor constituting a possible embodiment of the invention, this perspective view showing one possible shape for the ejection section of the sensor.

As shown in FIG. 15, the sensing element 9 is constituted by two main portions of cylindrical shape (a ceramic tube 21 and a support mandrel 22). These shapes enable energy to be exchanged in optimum manner with the fluid under measurement and consequently serve to reduce the error caused by heat transfer by conduction between the sensor and the sensing element. This effect is amplified by using a thermally insulating ceramic for the support mandrel.

Specifically, the fact of using ceramics for making the support of the measurement element provides improved mechanical strength and thermal decoupling.

It should be observed that such a structure presents improved resistance to fatigue.

Furthermore, such a structure makes it possible to guarantee electrical insulation that is better than that provided by technology relying on a metal support. In particular, the ceramic provides protection against lightning, which is not possible with metal supports.

In addition, the ceramic support provides effective thermal decoupling, even at low speed.

Figure 16:
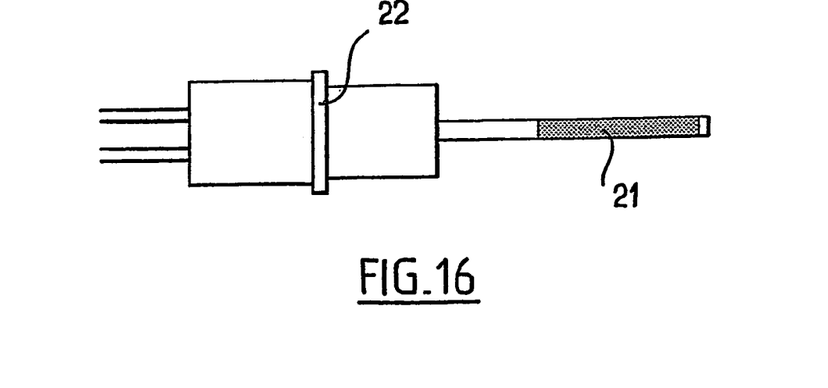
FIG. 16 is a diagrammatic side view of the sensing element.

The sensing element 21 is advantageously constituted by a ceramic tube having a resistive wire wound thereon.

The above-described improvements are advantageously applied to a sensor which includes a fixing flange presenting a bearing surface defining a fixing plane for the sensor and in which the streamlined body is inclined relative to the fixing plane and presents a longitudinal axis that extends other than perpendicularly relative to said plane.

More precisely, the sensor then extends so that the opening of the intake 1 lies in the fluid flow with the mast also being in the fluid, its main midplane being parallel to the flow direction thereof, the axis of said mast (i.e. the axis of the duct 3 and of the sensing element 9 referenced A in FIG. 3) being inclined relative to the fluid flow and being disposed at a certain angle relative to a direction that extends in said midplane perpendicularly to the fluid flow and to the fixing plane defined by the bearing surface 11a.

This inclination is "backwards", the head of the sensor, i.e. the air intake 1, being further back than the portion of the mast 2 that is furthest away therefrom relative to the fluid flow direction.

The angle between the axis A of the mast 2 and the above-mentioned perpendicular direction (angle α in FIG. 3) is about 5° to 15°.

The invention claimed is:

1. A sensor for measuring a physical parameter of a fluid, in particular for measuring total air temperature, the sensor comprising:
 a fluid intake fitted to a streamlined body;
 a duct provided in said streamlined body to enable fluid flow, said duct communicating with said fluid intake; and
 a sensing element disposed inside said duct;
 wherein the sensor comprises a fixing flange having a bearing surface defining a fixing plane for the sensor, and wherein the leading edge of said inlet section of said fluid intake extends so as to define a surface that slopes with respect to a surface perpendicular to the fixing plane, said sloping surface defining a sliding surface for any pieces of ice that may come to bear there against.

2. The sensor according to claim 1, wherein the inlet section presents an inclination with respect to a section orthogonal to the main flow direction of the fluid.

3. The sensor according to claim 1, wherein the inlet section defines a sliding surface that is concave or convex.

4. The sensor according to claim 1, wherein the fluid intake presents an inside section defined by two substantially plane surfaces extending facing each other, and interconnected by surfaces of rounded shape.

5. The sensor according to claim 1, wherein the streamlined body includes a longitudinal axis and the angle between the longitudinal axis of the streamlined body and the direction perpendicular to fixing plane lies substantially in the range of 5° to 15°.

6. The sensor according to claim 1, wherein the streamlined body is inclined relative to the fixing plane and presents a longitudinal axis which extends other than perpendicularly relative to said plane.

7. The sensor according to claim 6, wherein the angle between the longitudinal axis of the streamlined body and the direction perpendicular to the fluid flow lies substantially in the range of 5° to 15°.

8. The sensor according to claim 1, wherein the sensing element comprises a ceramic tube having a measurement resistive wire wound thereon.

9. The sensor according to claim 8, said sensor further comprising a support mandrel carrying the sensing element and made of a thermally insulating ceramic.

10. The sensor according to claim 8, wherein the streamlined body is inclined relative to the fixing plane and presents a longitudinal axis which extends other than perpendicularly relative to said plane.

11. The sensor according to claim 8, wherein the angle between the longitudinal axis of the streamlined body and the direction perpendicular to the fluid flow and/or to the fixing plane lies substantially in the range 5° to 15°.

12. The sensor according to claim 8, wherein the fluid intake presents an inside section defined by two substantially plane surfaces extending facing each other, and interconnected by surfaces of rounded shape.

13. The sensor according to claim 8, wherein the angle between the longitudinal axis of the streamlined body and the direction perpendicular to the fixing plane lies substantially in the range of 5° to 15°.

14. The sensor according to claim 1, wherein the fluid intake presents an inside section defined by at least one plane surface which communicates with a chamber that opens to the outside and that constitutes a boundary layer suction chamber;
 wherein said plain surface includes for this purpose a plurality of suction slots extending transversely relative to the general flow direction of the stream in the fluid intake.

15. The sensor according to claim 14, wherein the slots extend in said plane wall perpendicularly to the general flow direction of the fluid.

16. The sensor according to claim 14, wherein the slots extend in a chevron shape in said plane wall.

17. The sensor according to claim 14, wherein the slots extend through the thickness of the wall so as to slope downstream.

18. The sensor according to claim 14, wherein the streamlined body is inclined relative to the fixing plane and presents a longitudinal axis which extends other than perpendicularly relative to said plane.

19. The sensor according to claim 14, wherein the streamlined body includes a longitudinal axis and the angle between the longitudinal axis of the streamlined body and the direction perpendicular to the fluid flow lies substantially in the range of 5° to 15°.

20. The sensor according to claim 14, wherein the fluid intake presents an inside section defined by two substantially plane surfaces extending facing each other, and interconnected by surfaces of rounded shape.

21. The sensor according to claim 14, wherein the streamlined body includes a longitudinal axis and the angle between the longitudinal axis of the streamlined body and the direction perpendicular to the fixing plane lies substantially in the range of 5° to 15°.

* * * * *

UNITED STATES PATENT AND TRADEMARK OFFICE
CERTIFICATE OF CORRECTION

PATENT NO. : 7,441,948 B2
APPLICATION NO. : 10/517796
DATED : October 28, 2008
INVENTOR(S) : Marc Bernard, Cyril Barre and David Lapeyronnie It is certified that error appears in the above-identified patent and that said Letters Patent is hereby corrected as shown below:

Column 2, line 11, "than is pos-" should read -- than are pos- --.
Column 4, line 62, "in right section" should read -- in the right section --.
Column 7, line 58, "to fixing" should read -- to the fixing --.
Column 8, line 18, "in the range 5°" should read -- in the range of 5° --.

Signed and Sealed this

Twenty-ninth Day of December, 2009

David J. Kappos
*Director of the United States Patent and Trademark Office*